United States Patent [19]
Renteln

[11] Patent Number: 5,664,987
[45] Date of Patent: Sep. 9, 1997

[54] METHODS AND APPARATUS FOR CONTROL OF POLISHING PAD CONDITIONING FOR WAFER PLANARIZATION

[75] Inventor: Peter Henry Renteln, Sunnyvale, Calif.

[73] Assignee: National Semiconductor Corporation, Santa Clara, Calif.

[21] Appl. No.: 707,826

[22] Filed: Sep. 4, 1996

Related U.S. Application Data

[63] Continuation of Ser. No. 189,208, Jan. 31, 1994, abandoned.

[51] Int. Cl.$^6$ ............................................. B24B 49/00
[52] U.S. Cl. ...................... 451/21; 451/5; 451/41; 451/56; 451/287; 451/443; 451/444
[58] Field of Search .................. 451/5, 21, 41, 451/56, 444, 443, 287

[56] References Cited

U.S. PATENT DOCUMENTS

| | | | |
|---|---|---|---|
| 34,425 | 11/1862 | Schultz | 451/63 |
| 4,999,954 | 3/1991 | Miyamoto et al. | 451/5 |
| 5,212,910 | 5/1993 | Breivogel et al. | 51/398 |
| 5,216,843 | 6/1993 | Breivogel et al. | 51/131.1 |
| 5,308,438 | 5/1994 | Cote et al. | 451/41 |
| 5,421,769 | 6/1995 | Schultz et al. | 451/287 |
| 5,433,650 | 7/1995 | Winebarger | 451/287 |

OTHER PUBLICATIONS

GAARD Automation Flexible Automations Systems, Gaard Pad Conditioning Arm (no date).

Design News, Aug. 2, 1993, vol. 48/No. 15 cover page; pp. 5, 171, 81–84.

Fifteenth IEEE/CHMT International Electronics Manufacturing Technology Symposium Proceedings 1993 IEMT Symposium—Oct. 4–6, 1993, Santa Clara, CA USA cover pg; pp. ix, 235–239.

*Primary Examiner*—Robert A. Rose
*Assistant Examiner*—George Nguyen
*Attorney, Agent, or Firm*—Limbach & Limbach L.L.P.

[57] ABSTRACT

A method and apparatus for determining the amount of conditioning required to be applied to a polishing pad to achieve a desired removal rate during the polishing of a semiconductor wafer utilizes a rotating conditioning wheel in contact with a rotating polishing pad. Preselected points on just polished wafers are measured for removal rate and such measurements are used to calculate the removal rate as a function of wafer radius. When the removal rate changes by a preselected amount, the polishing pad is conditioned in accordance with the calculations.

20 Claims, 10 Drawing Sheets

5,664,987

METHODS AND APPARATUS FOR CONTROL OF POLISHING PAD CONDITIONING FOR WAFER PLANARIZATION

This is a continuation of application Ser. No. 08/189,208 filed on Jan. 31, 1994 abandoned.

A portion of the disclosure of this patent document contains material which is subject to copyright protection. The copyright owner, National Semiconductor Corporation, has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to semiconductor wafer processing and, more specifically, to methods and apparatus for the control of polishing pad conditioning.

DESCRIPTION OF RELATED ART

Integrated circuit manufacturing relies upon a process known as chemical-mechanical planarization ("CMP") to substantially smooth or polish a top layer or surface of a silicon wafer. In the fabrication of integrated circuits, typically, aluminum or another metal is deposited upon a silicon wafer and then patterned to form interconnect paths. These interconnect paths are then insulated with a deposited oxide layer, and this oxide layer is abraded to smooth its surface. In addition, such planarization is also utilized to smooth or polish the "poly layer," that is, the first insulating layer which is deposited after the transistors of an integrated circuit are formed within the wafer but before the deposit of the first metal layer.

As detailed in U.S. Pat. No. 5,216,843, POLISHING PAD CONDITIONING APPARATUS FOR WAFER PLANARIZATION PROCESS, which patent is hereby incorporated by reference, and as illustrated in FIG. 1 hereof, a CMP apparatus 10 polishes a wafer 12 which is positioned face down and in firm contact, under pressure, with a rotating polishing pad 14 which is mounted to a rigid platen 16. The wafer 12 is also rotated either about an axis coincident with its own center or offset from its own center, but not coincident with the axis of rotation of the polishing pad 14. A pH adjusted abrasive slurry 18 is delivered to the pad surface through a pipe 20. As a result of the rotating contact and abrasion between the polishing pad 14 of a top layer 22 of the wafer 12, oxide on the top layer 22 is removed thereby planarizing the top layer 22. The rate of this removal is closely proportional to the pressure applied to the wafer 12. In addition, the rate of removal depends upon the topography of the top layer 22, as higher features (i.e., features extending further from the wafer surface) are abraded faster than lower features, since the higher features are subject to greater pressure.

In further detail, the wafer 12 is secured to a cushion 24, which in turn is mounted onto a rotating platen 26. The platen 26 is rotated by a shaft 28 which is driven by a motor which is not illustrated.

One difficulty with the use of CMP is control of the process, that is maintaining the oxide removal rate constant across the top surface 22 of the wafer 12 as well as maintaining a constant oxide removal rate from one wafer to the next, when wafers are processed in succession. One known method of adjusting the oxide removal rate is by altering the surface state of the polishing pad 14. This alteration is known in the semiconductor industry as "dressing." Such "dressing" consists of scraping the surface of the polishing pad 14 with a knife-edge-type instrument, such as a razor blade, between the polishing of successive wafers or successive groups of wafers. This scraping removes debris from and re-roughens the surface of the polishing pad 14 to thereby help maintain a relatively constant removal rate from wafer to wafer. Without such dressing, or in the alternative, without repeatedly changing the polishing pad 14, the oxide removal rate would continue to fall as more wafers are polished, since the surface roughness tends to decrease and such roughness determines, in large part, the overall abrasiveness of the polishing pad 14 and slurry 18. The polishing pad 14 itself, however, provides no significant abrasive effect without the use of the abrasive slurry 18, even when the polishing pad 14 is fully conditioned.

Although the aforementioned U.S. Pat. No. 5,216,843 discloses a polishing pad conditioning apparatus and further suggests conditioning more at certain radii of a pad than at other radii of the pad, it would be desireable to provide a method and apparatus for determining the amount of conditioning required at each radii of a polishing pad, and based upon that determination, controlling the amount and location of conditioning of the polishing pad.

SUMMARY OF THE INVENTION

The present invention is directed toward a method and apparatus for determining the amount of conditioning required to be applied to a polishing pad to achieve a desired removal rate of an oxide, metal or silicon layer of a semiconductor wafer. The present invention is further directed toward a dynamic feedback control system which, based upon data measured from one or more polished wafers, calculates the amount and location of conditioning to be applied to a polishing pad, and based upon such calculations controls a conditioner to contact the polishing pad in accordance with such calculations.

The methods and apparatus of the present invention utilize a rotating conditioning wheel in contact with a rotating polishing pad. Preselected points on either a just polished production wafer or a just polished monitor wafer are measured for remaining film thickness and such measurements are used to calculate the removal rate as a function of wafer radius. When the radius specific removal rate changes by a preselected amount, the recipe, consisting of time spent by the rotating diamond conditioning wheel as a function of polishing pad radius, is altered based upon such measurements and subsequent calculations.

The above features and advantages of the present invention will become apparent from the following description and the appended claims taken in conjunction with the accompanying drawings.

DETAILED DESCRIPTION OF THE PRESENT INVENTION

Figure 1:
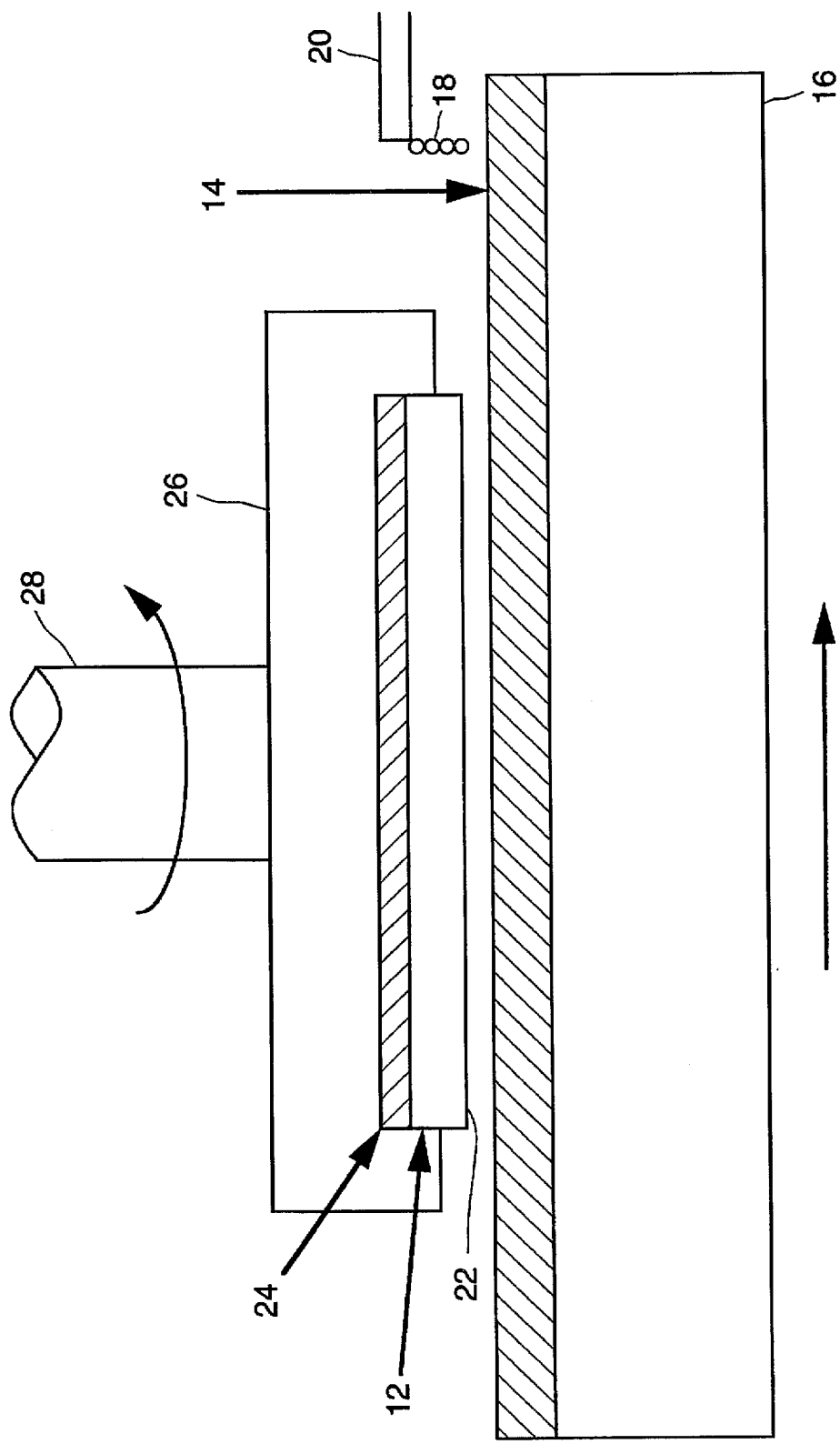
FIG. 1 is a front sectional view of a CMP apparatus.
Figure 2:
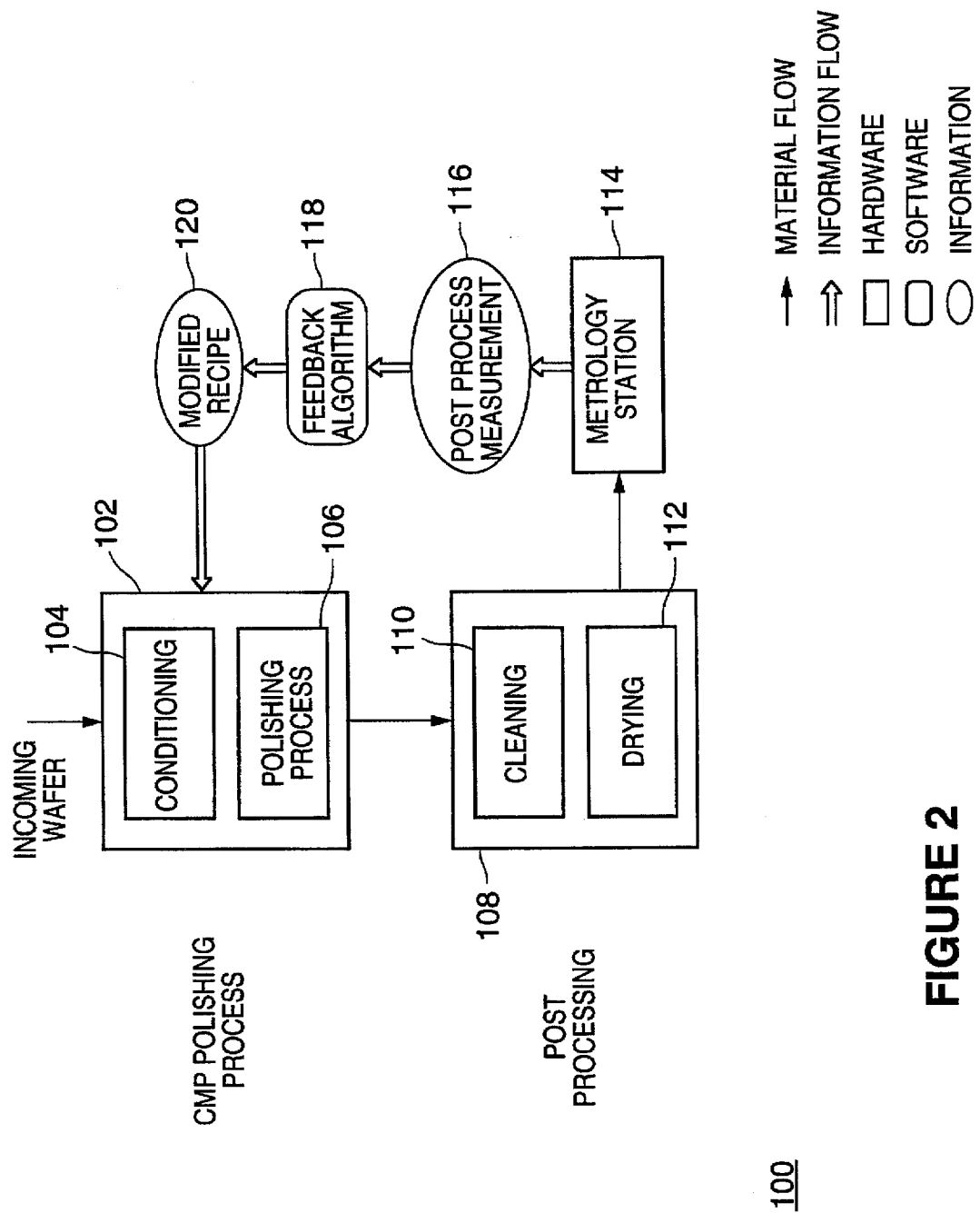
FIG. 2 is a block diagram illustrating the polishing pad conditioning method and apparatus of the present invention.

Referring now to FIG. 2, the method and apparatus of the invention is graphically illustrated at 100. Initially, as part of a CMP polishing process 102, a polishing pad may be preconditioned 104 by a conditioning wheel to alter the state of the surface of the polishing pad from that of a new pad. Such preconditioning may or may not be necessary depending upon the surface state of the polishing pad as delivered by the pad manufacturer. One manufacturer of such pads is Rodel, Inc. of Newark, Del. An appropriate polishing pad from Rodel Inc. is known by the designation "IC1000." Such pads generally consist of a top layer of blown polyurethane which is bonded or otherwise secured to a "supporting structure", which in turn is attached to a rotating rigid platen as earlier described with respect to FIG. 1. The "supporting structure" consists of a separate layer. Such a layer is typically a softer pad such as one available from Rodel, Inc. under the designation "SUBA IV." Pads having two, three or more layers may also be utilized in connection with the present invention. The layers of such multi-layer pads may be prelaminated.

As also earlier described with respect to FIG. 1, a polishing process 106 includes semiconductor wafer which is rotated about an axis, generally its own axis, while pressed against a rotating polishing pad, where the axis of rotation of the semiconductor wafer is offset from the axis of rotation of the polishing pad. During the polishing process 106 an abrasive slurry is deposited onto the polishing pad. The slurry consists of a silica based solution which is pumped through a pipe onto the polishing surface of the polishing pad. Such a slurry is available from Rippey Corp. of Eldorado Hills, Calif. under the designation SC112.

After the semiconductor wafer has been polished for a predetermined period, the period depending upon, among other factors, surface topography of the oxide layer of the semiconductor wafer to be polished, the abrasiveness of the slurry, the rotational velocity of the polishing pad/platen and the level of pressure applied by the polishing pad to the semiconductor wafer, the polishing process 106 is terminated, and a post polishing process 108 begins. The post polishing process 108 consists of cleaning 110 the polished semiconductor wafer on a second platen/pad wherein the pad is typically softer than the polishing pad. A surfactant or other additive (e.g., a small amount of abrasive slurry) may, if desired, be used at this step. Thereafter, the wafer is cleaned by a cleaning tool such as a wafer scrubber or a spin rinse dryer or other suitable wafer cleaning apparatus. Such cleaning tools are well known in the art and are commercially available. The wafer is then transferred to a metrology station 114 for measurement 116 of remaining oxide thickness at several points of the wafer at different distances from the center. The variations in remaining thickness as a function of radius are determined and data regarding such variations is input to a feedback algorithm 118 to determine the rate of oxide removal as a function of radius on the wafer. As detailed further herein, although remaining thickness is measured only as a function of radius, because of the relative motions of the wafer and the polishing pad, such measurements are representative of the oxide removal rate at all points which are the same distance from the center of the wafer.

Based upon a determination of the rate of oxide removal, a modified recipe 120 is generated for conditioning the polishing pad. This modified recipe 120 is provided to an actuation mechanism, for controlling the conditioning wheel. The modified recipe 120 specifies the period of time of conditioning (i.e., the amount of time the conditioning wheel conditions) of the polishing pad as a function of the radius of the pad.

Figure 3:
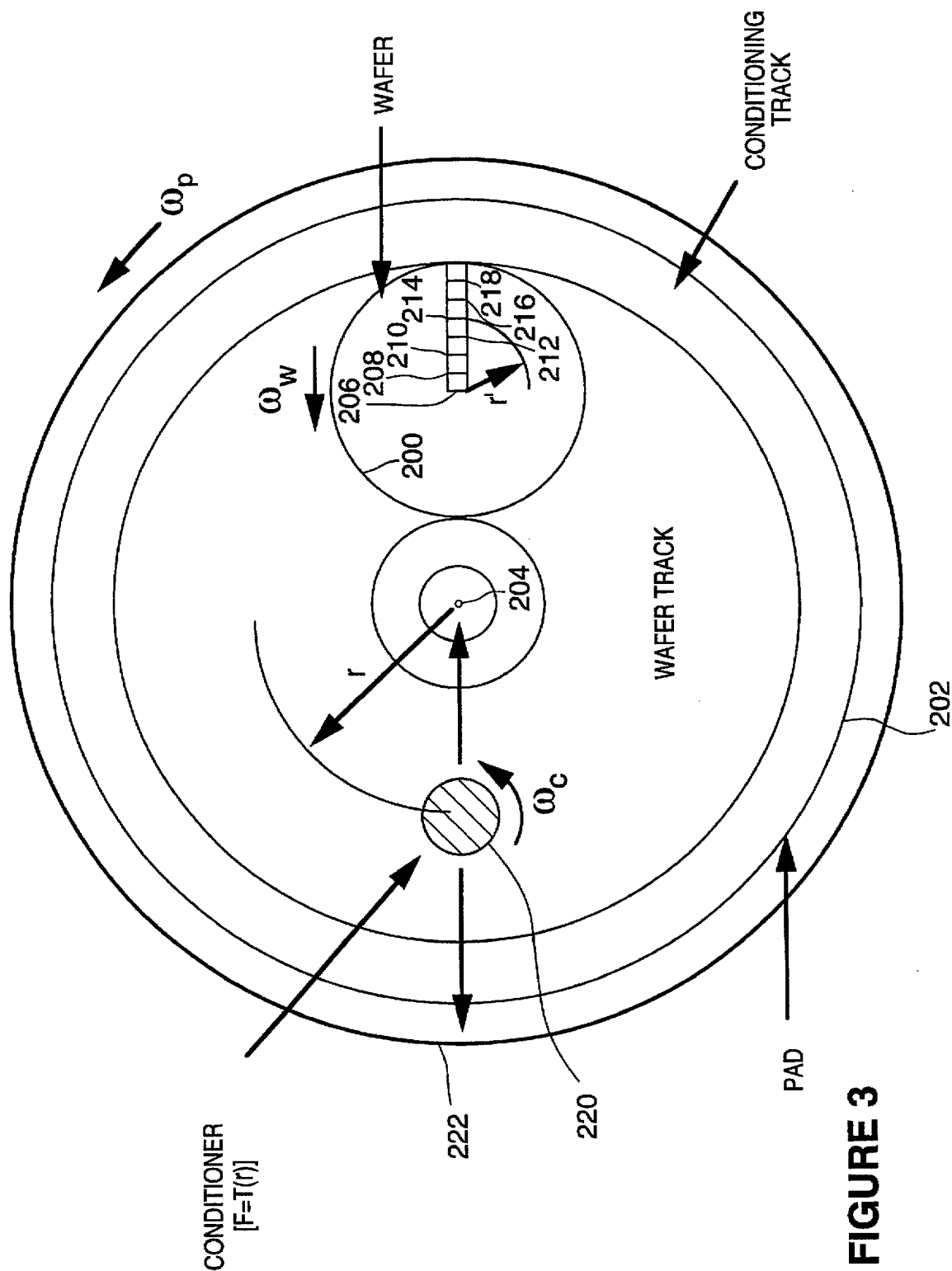
FIG. 3 is a schematic plan view illustrating the relative motions of a polishing pad, a semiconductor wafer and a conditioning wheel.

Referring now to FIG. 3, polishing pad conditioning in accordance with the present invention is described in greater detail. FIG. 2 illustrates the interaction of a semiconductor wafer 200 and a polishing pad 202. Although not shown in FIG. 3, an abrasive slurry is fed to the polishing pad surface of the pad 202 during the polishing process.

During polishing, the polishing pad 202 rotates counterclockwise at an angular velocity $\omega_p$ about an axis 204, while the wafer 200 rotates at an angular velocity $\omega_w$ about an axis 106. Typical angular velocities for $\omega_p$ and $\omega_w$ are 20 revolutions per minute and 30 revolutions per minute, respectively.

After a predetermined period of polishing, the wafer 200 is removed from the pad and is measured at several points 208, 210, 212, 214, 216 and 218 along a single radius of the wafer 200. Because of the relative motion of the polishing pad 202 and the semiconductor wafer 200, a single removal measurement at a single point or area along one radius is representative of the amount of material removed at all points or areas on the wafer 200 which are at the same distance from the axis 206 of the wafer 200.

Based upon these measurements, if the removal rate at a certain radius of the wafer 200 changes by a preselected value, a conditioning wheel 220 rotating about its axis at an angular velocity of $\omega_c$ is utilized to abrade or condition the surface of the polishing pad 202 at a specific radius of the polishing pad 202 which corresponds to the areas of the pad 202 which most often or for the longest period contacts that certain radius of the wafer 200. It is to be understood that a range of wafer radii can contact a specific radius of the polishing pad 202. In particular, this range includes all radii of the wafer 200 having a value greater than wafer radius which is coincident with said pad radius.

In the preferred embodiment of the invention, the conditioning wheel 220 conditions those portions of the polishing pad 202 within the region from the axis 204 to the pad's edge 222 which require conditioning to correct for an undesired oxide removal rate. The amount of time the conditioning wheel 220 spends at a specific distance from the axis 204 is dependent upon the results of the measurements made upon the polished wafer 200. In particular, for those radii where the oxide removal rate is less than a desired amount, the conditioning wheel conditions for a longer period to thereby increase the abrasiveness of the polishing pad and thereby increase the oxide removal rate. It is to be understood that such measurements are made on the surface of the wafer 200 which is polished by the pad 202, even though for purposes of illustration, FIG. 3 illustrates the reverse side of such wafer 200.

In further detail, those areas of the wafer 200 closer to the axis 206 more closely correspond to a particular radius of the polishing pad 202. Mathematically, the motion of a point on the wafer 200 relative to the polishing pad 202 can be expressed in cylindrical coordinates as:

$$dr_p/dt = -r_w r_c \omega_w \sin(\omega_w t + \alpha)/[r_w^2 + r_c^2 + 2r_w r_c \cos(\omega_w t + \alpha)]^{1/2},$$

and $$d\theta/dt = [[r_w \omega_w \cos(\omega_p t = \alpha)][r_p^2 + r_w^2 \sin^2(\omega_w t + \alpha)]^{-\frac{1}{2}}] - \omega_p r_p,$$

where:

$r_p$ = the distance from the center of the polishing pad to the point of interest = $[r_w^2 + r_c^2 + 2r_w r_c \cos(\omega_w t)]^{1/2}$, $r_w$ = the distance between the center of the wafer and the point of interest, $r_c$ = the distance between the pad center and the wafer center, $\omega_w$ = the angular velocity of the wafer, $\omega_p$ = the angular velocity of the polishing pad, t = time in seconds, $\theta$ = the angle between $r_c$ and $r_p$, which is = $\sin^{-1} [r_w/r_p \sin\phi] - \omega_p t$, $\phi$ = the angle between the extension of $r_c$ and $r_w$, which is = $\omega_w t + \alpha$, and, $\alpha$ = an arbitrary phase angle.

In one embodiment of the invention, the conditioning wheel 220 is a 2 inch diameter 200 grit diamond conditioning wheel which rotates at about 30 rpm. This diamond conditioning wheel contacts the polishing pad under low pressure (about 1.4 psi averaged over the entire area of the conditioning wheel). The abrading surface of the conditioning wheel 220 consists of a polygon walled honeycomb-like metallic structure, having sides and vertices into which are embedded numerous industrial grade diamonds. Such a conditioning wheel is available from TBW Industries of Furlong, Pa. under the model designation "Diamond Grinding Disk."

Figure 4:
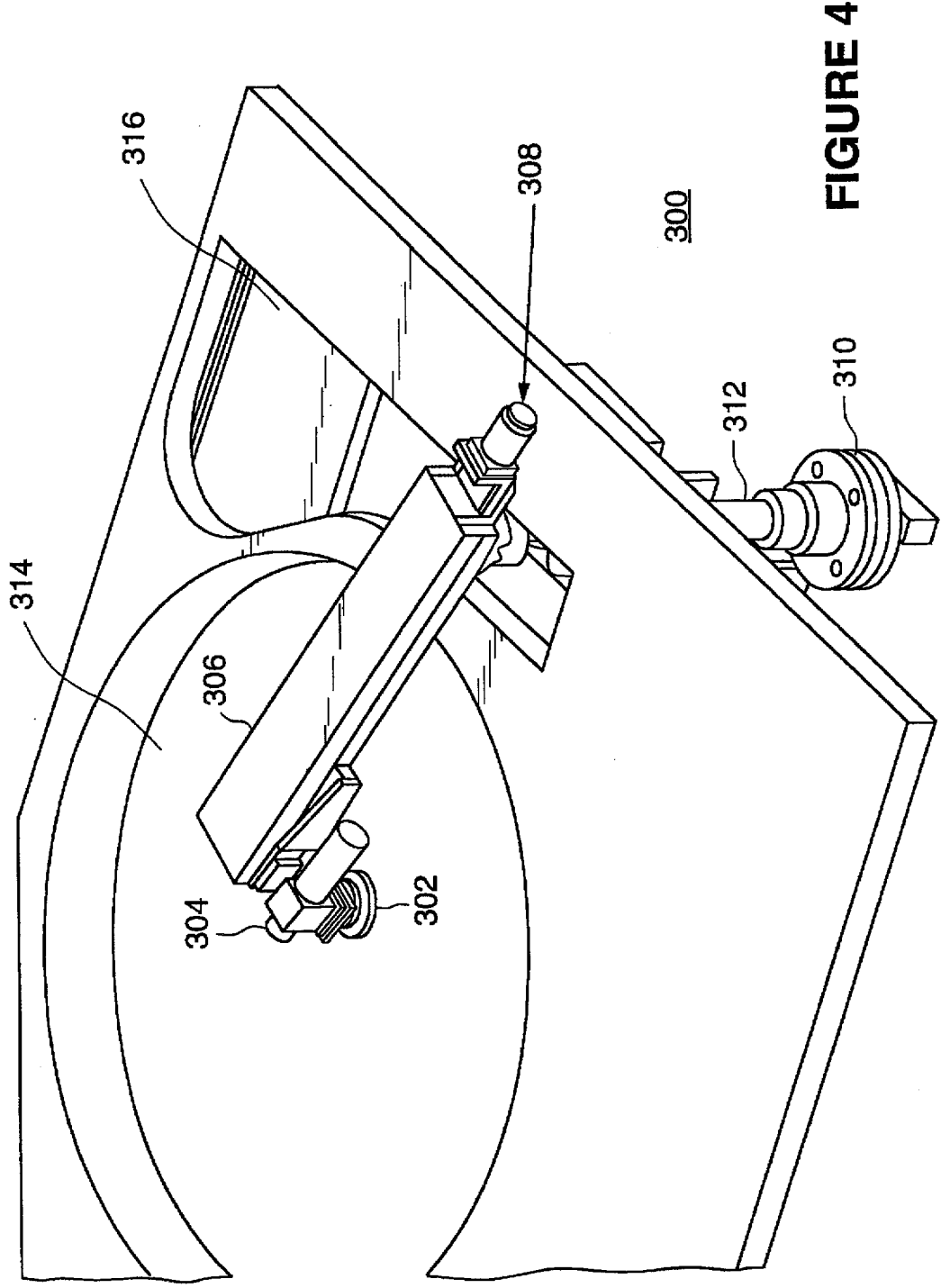
FIG. 4 is a partial perspective view of a mechanism for controlling the position of a conditioning wheel.

Referring now to FIG. 4, a conditioning wheel positioning apparatus 300 is shown. This conditioning wheel positioning apparatus 300 is now available from Westech Systems, Inc., of Phoenix, Ariz. under the model designation "APP-1000". In further detail, a conditioning wheel 302 is coupled to and rotated by a conditioning wheel motor 304. This assembly is secured to a horizontal ball screw actuator 306. A horizontal ball screw motor 308, which is coupled to the horizontal ball screw actuator 306, is controlled in either a forward or reverse direction to position the conditioning wheel 302 in a "horizontal" direction. A vertical motor (not shown) is connected to a rotation coupling 310, which in turn drives a linear ball spline shaft 312. The vertical motor is a stepper motor which is used to rotate the entire horizontal ball screw actuator 306 to thereby move the conditioning wheel 302 in a "vertical" direction. This arrangement provides for precise positioning of the conditioning wheel 302 upon the surface of a polishing pad 314.

In the preferred embodiment of the invention, the conditioning wheel motor 304, the horizontal ball screw motor 308 and the vertical motor are coupled, through motor drivers, to a General Electric Fanuc Series 90-30 programmable controller. This programmable controller receives instructions concerning the desired positioning of the conditioning wheel 302 as a function of time, and executes such instructions. After conditioning of the polishing pad 314, the conditioning wheel 302 is parked at a conditioning wheel clean station 316 to permit, if necessary, cleaning of the conditioning wheel 302.

Figure 5:
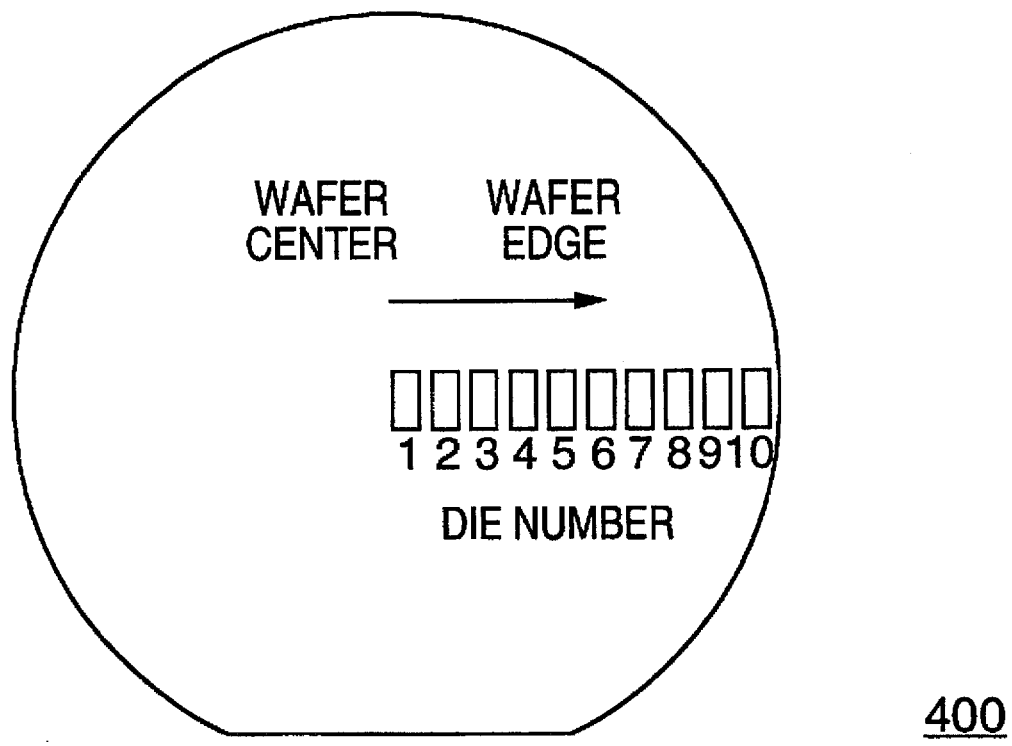
FIG. 5 is a plan view of the top layer of a semiconductor wafer illustrating the relative positioning of dies within the wafer.

A typical semiconductor wafer 400 illustrating the relative positioning of ten dies, 402, 404, 406, 408, 410, 412, 414, 416, 418 and 420 from the center of the wafer 400 to the edge of the wafer 400 is shown in FIG. 5. In the preferred embodiment of the invention, as explained further herein, measurements of remaining thickness are made at radii which correspond to identical structures either within, abutting or surrounding each die.

Figure 6:
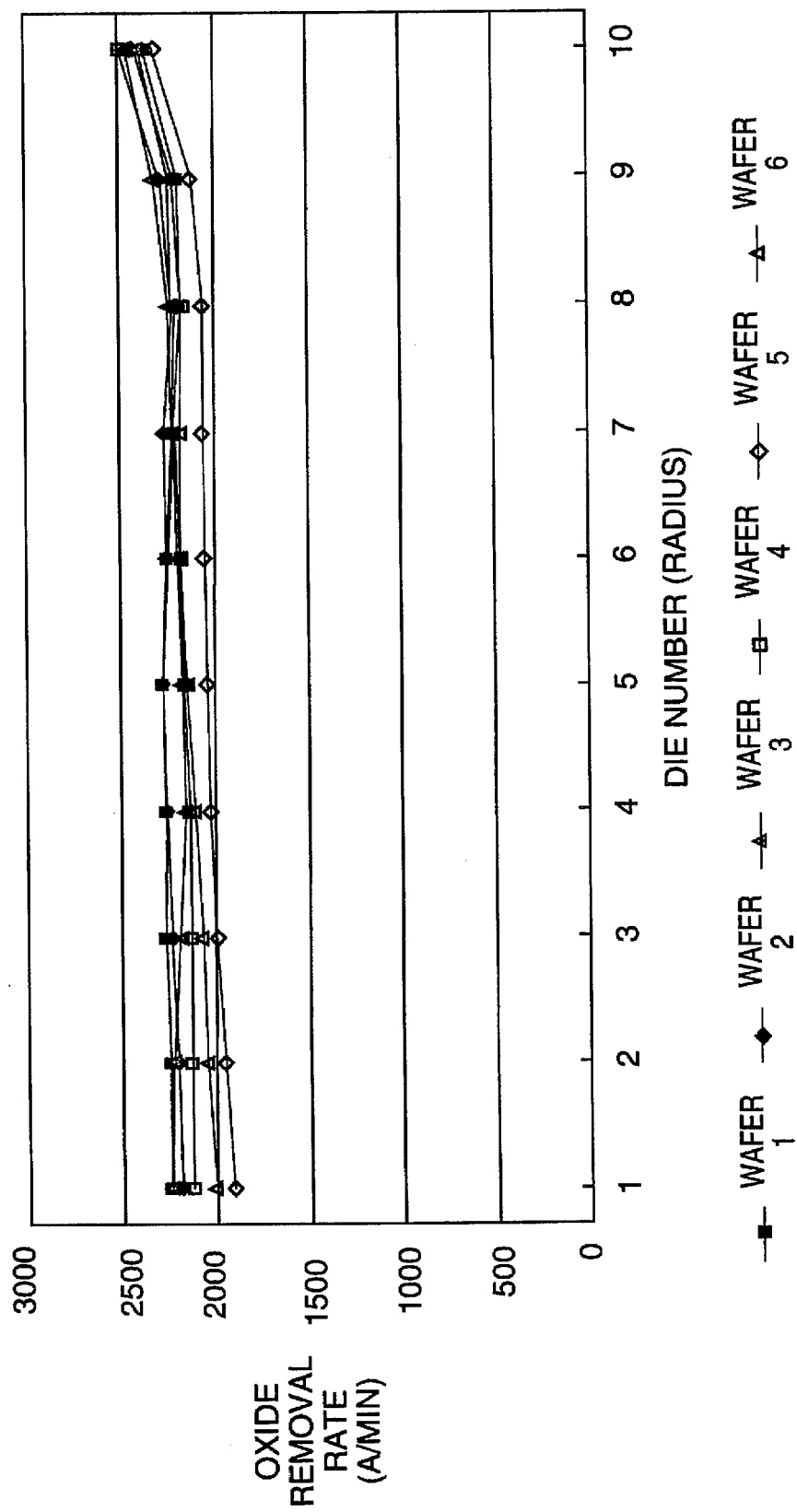
FIG. 6 is a graph illustrating the oxide removal rate for multiple wafers as a function of the distance from the center of each wafer.

By way of experimental data, FIG. 6 illustrates within wafer uniformity as well as wafer to wafer uniformity. With the polishing apparatus of the present invention, the oxide removal rate is fairly constant from the inner most die (die 502 in FIG. 6) to the third die from the wafer edge (die 416 in FIG. 5). However, as FIG. 6 illustrates, that the removal rate increases toward the edge of the wafer (418 and 420 of FIG. 5).

Figure 7:
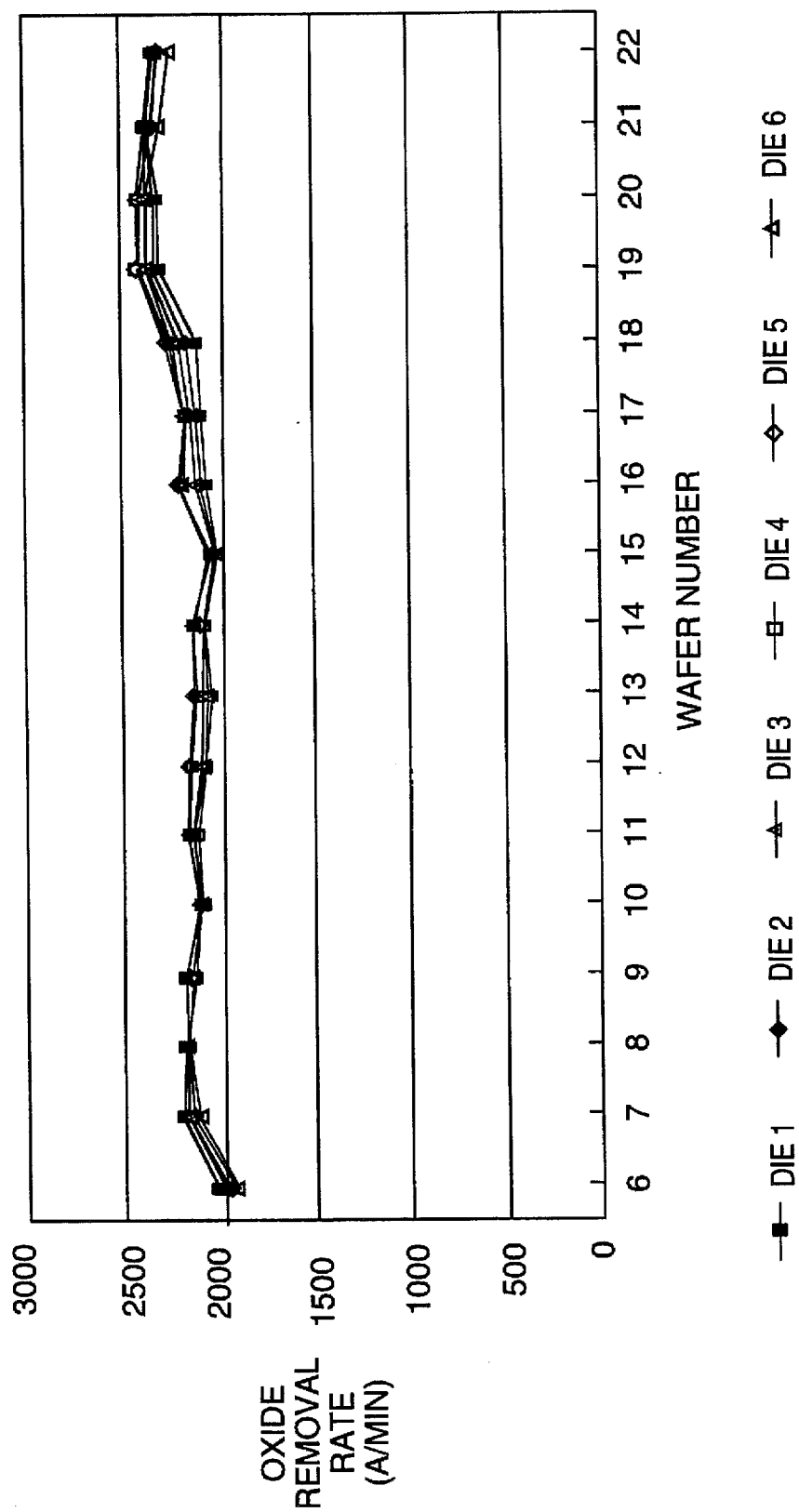
FIG. 7 is a graph illustrating the oxide removal rate for specified die locations on a wafer as a function of the number of wafers which have been polished in succession.

FIG. 7 illustrates, by way of experimental data, that although the oxide removal rate is fairly constant with respect to the six innermost dies within a polished wafer, the oxide removal rate fluctuates from one wafer to the next, with the oxide removal rate peaking with the twentieth wafer and decreasing thereafter.

Figure 8:
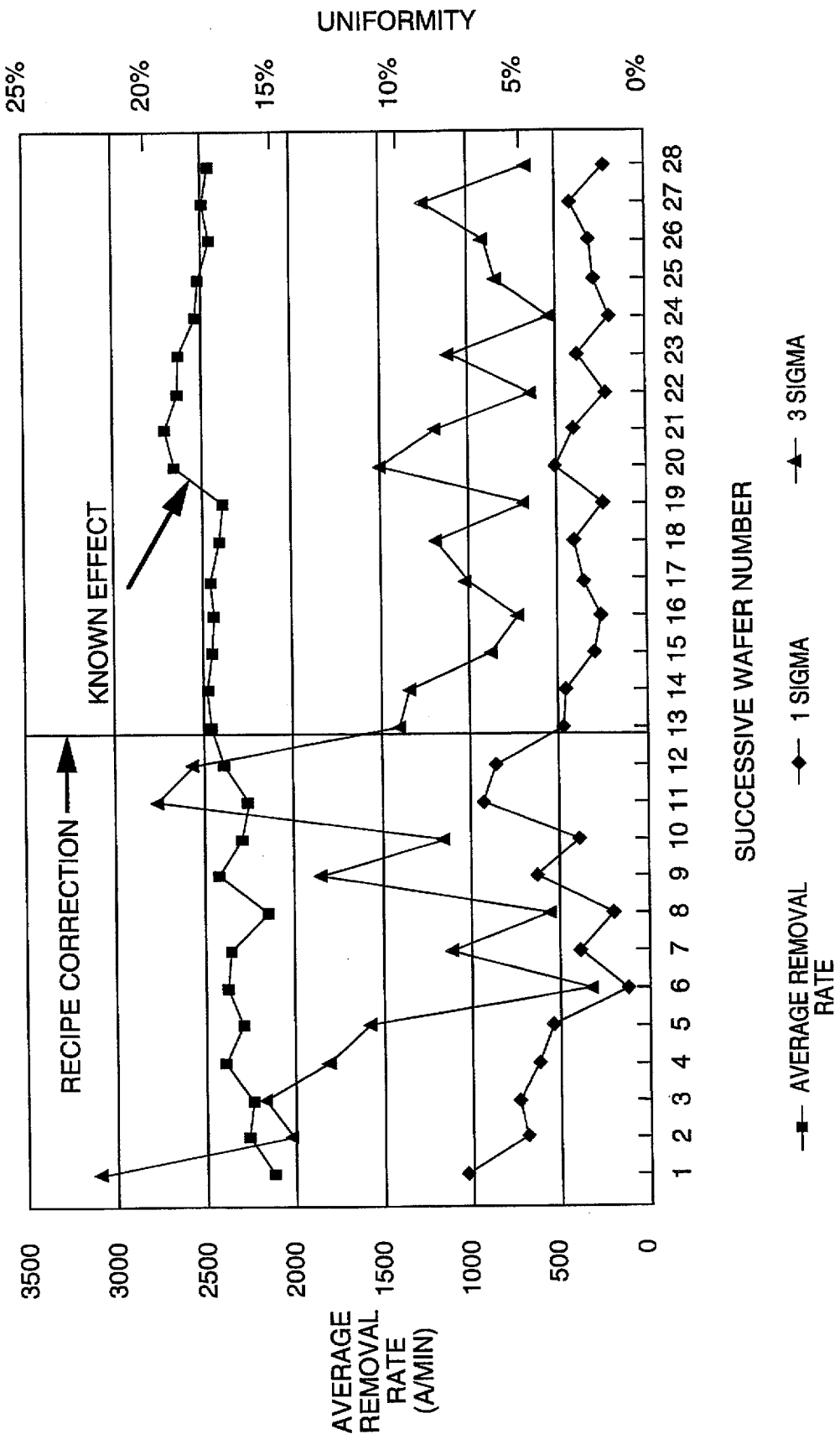
FIG. 8 is a graph illustrating sample measurements of average removal rate and surface uniformity of successively polished wafers both before and after conditioning of a polishing pad.

Referring now to FIG. 8, the average removal rate of successively polished wafers is shown near the top of the graph. The "average" is actually a weighted average, with the measurements at points further from the center of the wafer given greater significance. The calculated non-uniformity which is derived from within wafer measurements of oxide layer thickness are graphed for both 1 sigma and 3 sigma. As illustrated in FIG. 8, when the non-uniformity exceeds a level of about 8% for three successive wafers, a recipe correction is made (after the polishing of wafer number 25 but before the polishing of wafer number 26), and as further illustrated in FIG. 8, the recipe correction results in a significantly reduced level of non-uniformity from one wafer to the next.

Figure 9:
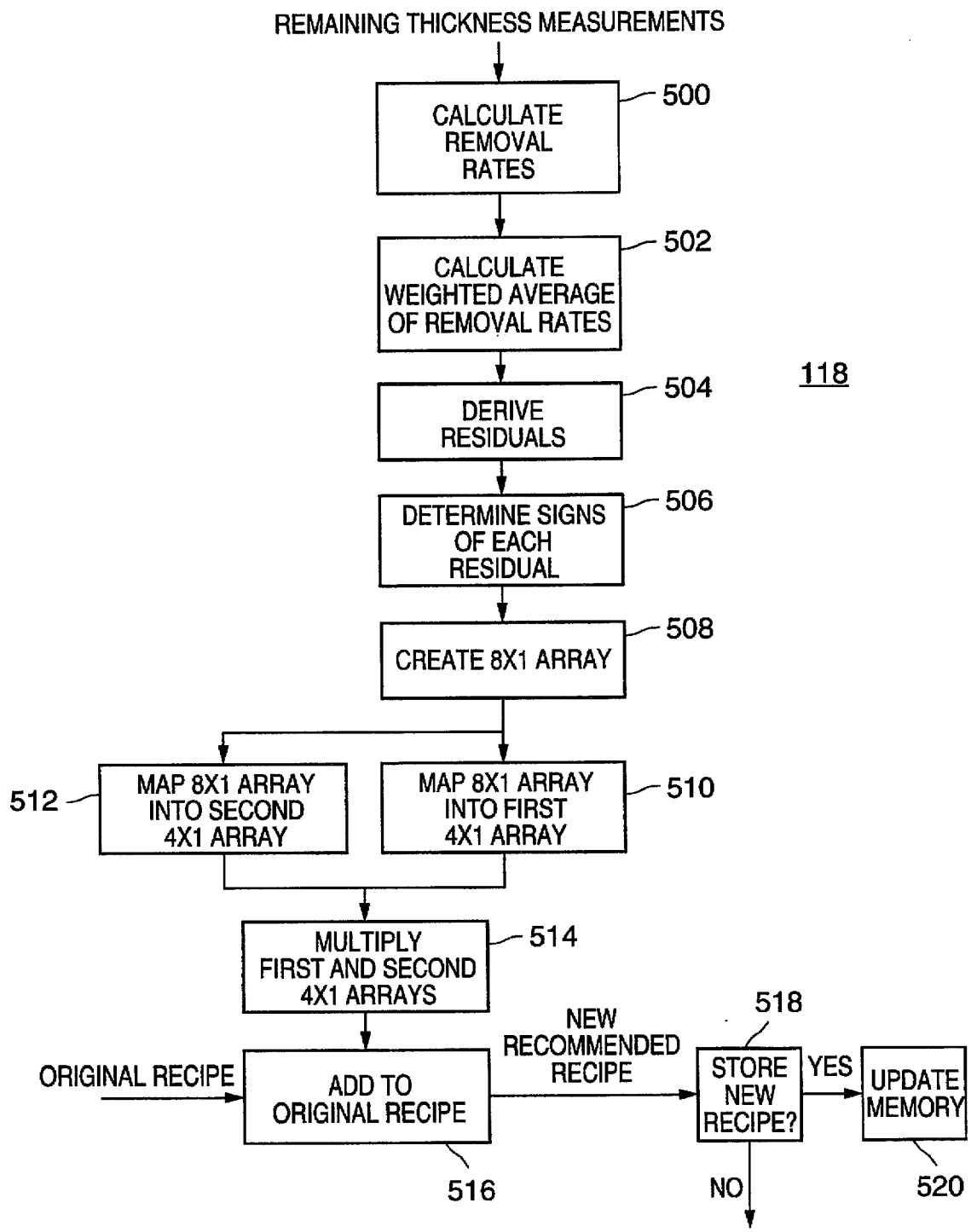
FIG. 9 is a flow chart illustrating the steps of a first feedback algorithm in accordance with the present invention.

With reference now to both FIGS. 2 and 9, the post polishing process measurement step 116, the feedback algorithm 118 and the generation of a modified recipe 120 are described in greater detail. The post polishing process measurement step consists of measuring the initial (prepolishing) thickness of the oxide layer, $t_{initial}$, and after polishing, measuring the thickness of the remaining oxide layer, $t_{final}$. The rate of removal is thus = $[t_{initial} - t_{final}]$/time, expressed in units of Angstroms/minute.

Such oxide layer thickness measurements may be performed with a measuring instruments manufactured by Tencot of Mountain View, Calif., and available as model number TF-2. The measurement data is provided from the measuring instrument to the feedback algorithm 118 through an electronic/software interface.

In further detail, referring to FIG. 9, the feedback algorithm 118, receives the measurements of remaining oxide layer thickness at each of ten points of the oxide layer, and at step 500 calculates the removal rate at each of these ten points based upon prepolishing measurements. At step 502, the weighted average of the removal rates is calculated and at step 504 the removal rate for each of the ten points is subtracted from the weighted average (or a target value) to provide a "residual." At step 506, 10 residual values are evaluated to determine if each residual has the same sign as its two nearest neighbors. This results in, at step 508, the creation of an 8×1 array of numbers consisting of ones, minus ones and zeros. Ones correspond to a point of positive sign surrounded by neighbors of having a positive sign, minus one corresponds to a point of negative sign surrounded by neighbors having a negative sign, and a zero corresponds to either (1) a point of positive sign having at least one neighbor having a negative sign, or to (2) a point of negative sign having at least one neighbor having a positive sign.

At step 510 the 8×1 array of numbers is mapped into a first 4×1 array of numbers to indicate which segments of the polishing pad to condition more, which to condition less and which to leave unchanged. Mapping the 8×1 array of numbers into a 4×1 array of numbers provides only 4 degrees of freedom. It has been determined experimentally, however, that conditioning with mirror symmetry around the polishing pad radius at which the center of the wafer is located is the most effective method of changing uniformity. In further detail, to achieve maximum resolution of the conditioner, only 8 of the 10 segments (or zones) are required. Discarding segments 1 and 2 leaves eight zones centered around the center of the wafer. Thus, because of mirror symmetry, 4 degrees of freedom are provided. The map is such that point 1 (corresponding to dies 1, 2 and 3 of FIG. 5) is affected by the first segment, points 2 and 3 (dies 2, 3 and 4 of FIG. 5) are affected by the second segment, points 4 and 5 (dies 4, 5, 6 and 7 of FIG. 5) are affected by a third segment, and points 6, 7 and 8 (dies 6, 7, 8, 9 and 10 of FIG. 5) are affected by the fourth segment. This mapping creates the first 4×1 array of numbers in which the entry in each of the segments is equal to the logic designator associated with that segment. Plus ones will receive less conditioning time, minus ones will receive more conditioning time, zeros will not change.

At step 512, a second 4×1 array of numbers is created in which entry in each of the segments is equal to the actual magnitude of the residuals associated with that segment. Since there are several die associated with each segment, the maximum residual within each group is used.

At step 514, the elements of the first and second 4×1 array of numbers are multiplied across (i.e., element i is multiplied by element i). This product is then multiplied by the negative of a sensitivity factor to generate a third 4×1 array of numbers. This third 4×1 array of numbers indicates the time (in seconds) by which the original conditioning recipe should be changed. The sensitivity factor is the conversion factor between changes to the conditioning time and change in the removal rate contributed by that zone. Upon completion of the response of the system to the change in conditioning time, the removal rate at each radius should equal either the mean removal rate of the measured wafer or (if a target value was chosen) the target removal rate.

At step 516 this third 4×1 array of numbers is added to the original conditioning recipe to yield a new recommended recipe. It is to be understood that although this calculation is performed for each set of remaining thickness measurements, the algorithm will recommend a recipe change either only if the 3 Sigma value exceeds a predetermined value, or if a target value is used, when the average rate deviates from the target rate by a predetermined value. Based upon data from experiments, 10% (3 sigma) is a desireable uniformity.

At step 518, the user is prompted to determine whether the user wishes to store the new recipe. If the user chooses to store the new recipe, then, at step 520 the variable "recipe" is updated, and such updated recipe is used the next time the algorithm (program) is run.

In those cases where there are not sufficiently large areas on a actual production wafers from which to measure remaining thicknesses, monitor wafers may be utilized to allow the necessary measurements. Monitor wafers are non-production wafers which are utilized primarily to determine removal rate. Such monitor wafers provide specified areas for measurement of remaining thickness.

The following is a listing of the software for the above described algorithm:

Copyright © 1994 National Semiconductor Corporation

```
%This Matlab algorithm takes as inputs the present recipe of the sweep
%arm conditioner (in seconds, from center to edge), reads wafer output
%data from the virtual D drive, determines whether a recipe change is
%called for, and reports what it should be. "rtematrx" is the removal
%rate data stored in matrix format and placed in a file named after the
%cassette from which the wafers came.
function [recipe,rtematrx] = algorith(recipe)
%"sensitivity" is the conversion factor between the observed deviation
%of the data from the target and the suggested change in conditioning
%time of the corresponding radius.
sensitivity=85;
target=2300
%This statement is required only because Matlab has a habit of
%transposing matrices.
if size(recipe)==[1,4],
recipe=recipe';
end;
%Display the present recipe
disp(' ');
recipe
disp(' ');
%The user is prompted to input the cassette and wafer number he or
%she wishes to analyze (i.e. the most recent monitor wafer ran).
disp('Please input: ');
lot=input('    lot number: ','s');
wafer=input('    wafer number: ','s');
disp(' ');
disp('**************  Result  ****************');
%The prepolished and postpolished data are given file names:
fnamepr=('d:\matlab\matdata\',lot, 'pre. ',wafer, '1'];
fnamepo=['d:\matlab\matdata\',lot 'post. ',wafer, '1'];
%Each opened file gets assigned a file number by Matlab
f1=fopen(fnamepr);
f2=fopen( fnamepo);
%Once the file is opened, Matlab must be told where to go in that file to
%find the pertinent data. This loop sends a "pointer" to the 20th line.
for i=0:18
    fgetl(f1);
    fgetl(f2);
end
%This reads all 6 columns in general format.
b1=fscanf(f1,'%g %g %g %g %g %g',[6,inf]);
b2=fscanf(f2,'%g %g %g %g %g %g',[6,inf]);
%The pertinent data is in the first column. As usual, the matrix must
%first be transposed.
b1=b1';
b2=b2';
a1=b1(:,1);
a2=b2(:,1);
%The mean rate is calculated from the pre and post data for a 3 minute
%polishing time.
name=[lot,'.',wafer];
rate=(a1–a2)/3
%Create the matrix of rates. Start by forming a matrix of zeros.
rtematrx=zeros(10,25);
%A format statement is required
for i-1:25,
dataformat=[dataformat,'%4.0f '];
end
dataformat=[dataformat,'\n'];
fnamedata=['d:\matlab\matdata\',lot,'.dat'];
%Read the present matrix, if it exists. If it does not exist, the file I.D.
%assigned to it by the "fopen" command will return a –1.
f3=fopen(fnamedata,'r');
if f3>0,
rtematrx=fscanf(f3,'%f',[25 10]);
fclose(f3);
```

```
rtematrx=rtematrx';
end
%Put the rate data from the present wafer in the appropriate column of
%the 10x25 matrix (a lot will have no more than 25 wafers).
wafnum=str2num(wafer);
rtematrx(:,wafnum)=[rate];
f3=fopen(fnamedata,'wt');
fprintf(f3,dataformat,rtematrx);
%Calculate the deviation of each of the 10 points from either the mean
of those points or from a target value.
disp('Would you like to use a floating mean")
answer=input('or a target value? (f/t)? [t]:','s';
        if isempty(answer)
           answer = 't';
        end
        if (answer == 'f'),
           mrate=mean(rate);
           mratevec=mrate*ones(10,1);
           residual=(rate-mratevec)/mrate;
           res=residual;
           disp(' ');
           disp('Average Rate will not be controlled.");
        else
           targvec=target*ones(10,1);
           residual=(rate-targvec)/target;
           residual=(rate-targvec)/target;
           res=residual;
           disp(' ');
           com=['Average rate will target'];
           ans=[com,' ', num2str(target),' A/min];
           disp(ans);
           disp(' ');
        end
%This is the calculation of the 3 Sigma value of the 10 points and its
%display, followed by the display of the plot of the points.
Thresig=3*std(a)*100;
show=['3-sigma: ',num2str(Thresig)];
disp(' ');
disp(show);
plot(rate);
axis([0 10 0 3500]);
xlabel('Die Number');
ylabel('Removal Rate');
grid on
axis('on')
name [num2str( lot),'.',num2str(wafer)];
title(name)
%One of the criteria for corrective action is that 3 contiguous points lie
%on one side of the mean. yyy is an 8 by 1 logic % array of numbers
indicating this criterion.
yyy=zeros(8,1);
for i=1:8
   signmatrix=[sign(residual(i))sign(residual(i+1));...
        sign(residual(i+2))];
   if (sum(signmatrix) == 3),
        yyy(i)=1;
   elseif (sum(signmatrix) == -3),
        yyy(i)=-1;
   else
        yyy(i)=0;
   end
end
b=yyy;
%Now the 8 points must be mapped to the 4 adjustable parameters
%available as inputs.
xxx=zeros(4,1);
xxx(1)=sign(yyy(1));
xxx(2)=sign(yyy(2)+yyy(3));
xxx(3)=sign(yyy(4)+yyy(5));
if (yyy(6)+yyy(7)+yyy(8)) >= 2,
   xxx(4)=-1;
elseif (yyy(6)+yyy(7)+yyy(8)) <= -2,
   xxx(4)=1;
end
c=xxx;
%The final factor involved in correcting the recipe involves wallowing
%the data point farthest from the mean to determine the extent of
%correction for that segment.
w=zeros(4,1);
w(1)=max(abs(a(1)),max(abs(a(2)),abs(a(3))));
w(2)=max(abs(a(2)),max(abs(a(3)),max(abs(a(4)),abs(a(5)))));
w(3)=max(abs(a(4)),max(abs(a(5)),max(abs(a(6)),abs(a(7)))));
w(4)=max(abs(a(6)),max(abs(a(7)),max(abs(a(8)),max(abs(a(9)),abs(a(10))))));
%Finally, a new recipe is calculated consisting of the logic array of
%numbers, the extent of correction array of numbers, a sign correction
%(rates below the average get MORE conditioning time), and the fudge
%factor, the experimentally determined "sensitivity". The correction
%factor is added to the original recipe.
d=-sensitivity*c.*w+recipe;
%Sometimes this formula will recommend a negative conditioning time.
%In that case all values in the recipe are increased by an amount equal
%to the greatest negative value suggested.
   dmin=min(d);
   if dmin<0,
       d = d-dmin;
   end
%Calculate the total conditioning time.
show=[d,recipe];
total=[2*sum(d)+.2,2*sum(recipe)+.2];
%Apply the criterion for recommending a revised recipe and tell the
%operator. Also display the new recipe and the total times of both.
if (Thresig < 9),
    disp(' ');
    disp('Suggestion: Do not change recipe'),
    disp(' ');
else disp(' '),
    disp('Suggestion:')
    disp(' '),
    disp(' New-recipe(sec)   Old-recipe(sec) '),
    disp(' '),
    disp(show);
    disp('Total time (sec): '),
    disp(' '),
    disp(total);
%If a new recipe is suggested, the user has the option to have the new
%recipe inserted into the variable "recipe".
    answer=input('Would you like to update the recipe (y/n)? [y]:','s');
        if isempty(answer)
           answer = 'y';
        end
        if (answer == 'y'),
           disp(' ');
           disp('New recipe is now:');
           disp(' ');
           recipe=d;
           disp(recipe);
        else
           disp(' ');
           disp('Current recipe maintained.'),
           disp(' ');
        end
end
%Matlab requires the file pointer to be returned to zero to close the file.
frewind(f1);
frewind(f2);
fclose('all');
end
```

Figure 10:
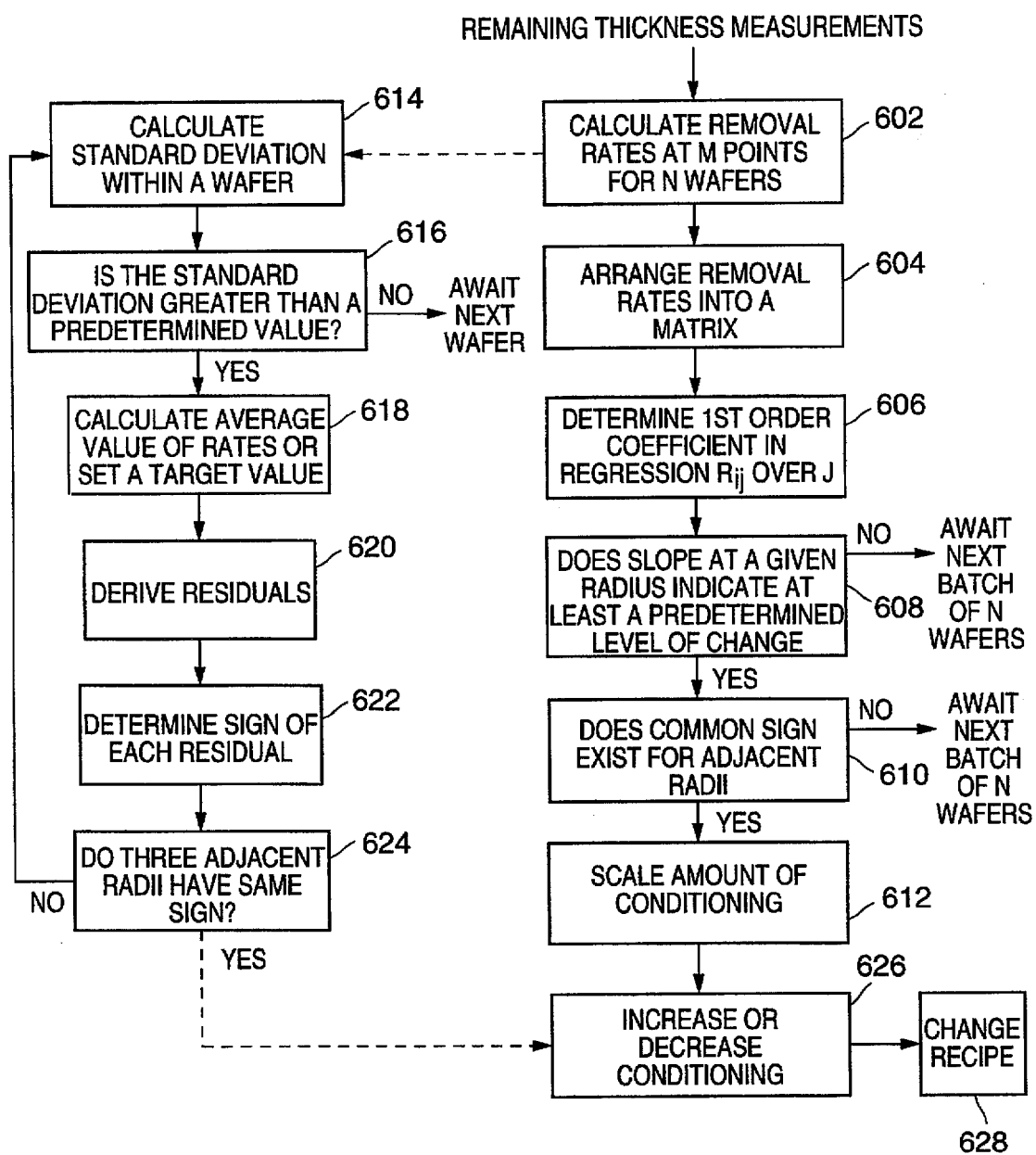
FIG. 10 is a flow chart illustrating the steps of a second feedback algorithm in accordance with the present invention.

Referring first to the right-hand side of FIG. 10, as an alternative to the above method, a second embodiment of the invention utilizes a different feedback algorithm 600 which analyzes remaining thickness measurements to calculate, at step 602, removal rates and, at step 604, places these removal rates within a matrix of removal rates for a batch of n wafers in which m evenly spaced points are measured along a radius from the center of each wafer to the edge of each wafer. At step 606, the 1st order coefficient in the regression of $r_{i,j}$ over j is determined (i.e., the progress of the rate at a given radius from wafer to wafer), where i=wafer number, and j=die number with die 1 being closest to the center of the wafer, and, at step 608, if the slope is significantly different from zero, a correction is made to increase the amount of conditioning at the radius of the polishing pad corresponding to a radius of the semiconductor wafer. The increase in the amount of conditioning is proportional to the negative of the slope. Stated differently, if the slope indicates a 5% drop in removal rate (at a given radius) over a fixed batch size (for example for 10 semiconductor wafers) the conditioning time at that radius (and its mirror image around the wafer center or axis) should be increased by an amount proportional to 5%. For stability, the slope must be one of statistical significance, and a common sign (positive or negative) must exist for several adjacent radii, where "several defines a distance comparable to the diameter of the diamond conditioning wheel. The existence of this condition is determined at step 610. However, it has been determined through experimentation, that the increase, while proportional to, for example 5%, must be scaled at step 612 by a factor of anywhere from 2 to 8.

In order for this "trend" methodology to provide the desired response, the system must yield uniform wafers before the trend methodology is evoked, otherwise a non-uniformity will be maintained from wafer to wafer. That is, monitoring only the wafer to wafer change of rate for each radius is insufficient to maintain the process at optimized uniformity. Therefore, in such a case, a system must be used in which the uniformity is initially corrected in a manner as set forth by the previously described algorithm. Thus, provision must be made to return the system 10 to equilibrium based upon the measurement of a single wafer which indicates out of specification uniformity.

Referring now to the left-hand side of FIG. 10, there is shown the application of the first described algorithm in combination with the algorithm illustrated on the right-hand side of FIG. 10. In greater detail, the control mechanism for applying this second criteria is fundamentally the same as that for triggering a conditioning of the polishing pad. However, the application of this second criteria is activated by the trigger mechanism as previously set forth with respect to FIG. 9. In this case, at step 614, a standard deviation must be calculated for $r_{i,j}$ over i (within a wafer), and compared to some percentage of the specification, which is 20%, 3 sigma). Then, at step 616, if the within wafer uniformity ("WIWU") is greater for example, 3 sigma, the average value is calculated at step 620. At step 622, each data point is subtracted from the average value to obtain residuals for each point. At step 624, neighbors are checked to determine whether they each have the same sign. If its neighbors do have the same sign, then the conditioning time corresponding to that set of points is, at step 626, increased or decreased by an amount which is proportional to magnitude of the residual or the magnitude of the residual divided by the mean rate. Then, at step 628, the previous recipe is changed.

It is to be understood that alternative but similar methodologies could be evoked to provide a desired conditioning effect on a polishing pad. For example, a trigger for initiating a correction could be based not upon the overall nonuniformity, but instead upon any of the local removal rates.

Although the invention has been described with respect to a polishing pad constructed of a single layer of blown polyurethane, the invention may be used with single and multiple layer polishing pads fabricated of other materials. In addition, it is to be understood that the present invention may be used with polishing pads which have been preconditioned, such as with concentric grooves as illustrated in U.S. Pat. No. 5,216,843.

While only certain preferred embodiments have been described in detail, as will be apparent to those familiar with the art, certain changes and/or modifications can be made without departing from the scope of the invention as defined by the following claims.

I claim:

1. A method for polishing a top layer of each of a plurality of semiconductor wafers, comprising the steps of:

measuring a thickness of the top layer of at least one semiconductor wafer at a predetermined number of points of the top layer of the at least one semiconductor wafer;

rotating a platen, the platen including a pad covering a planar surface of the platen, the pad having an upper surface;

depositing an abrasive slurry onto the upper surface of the pad;

pressing the upper surface of the pad against successive rotating semiconductor wafers, a rotational axis of the semiconductor wafers offset from a rotational axis of the platen;

remeasuring the thickness of the top layer of the at least one semiconductor wafer at the predetermined number of points of the top layer of the at least one measured semiconductor wafer; and based at least upon the measured thickness and the remeasured thickness, calculating when a removal rate of the top layer changes from a desired value by a predetermined value at a predetermined radius of the at least one measured and remeasured semiconductor wafer and, in response thereto, conditioning each area of the pad corresponding to the predetermined radius for an interval corresponding to the change in the removal rate at such predetermined radius.

2. The method of claim 1, further comprising the steps of:

determining a number of wafers polished by the pad; and governing the duration of the conditioning intervals for succeeding wafers to be polished as a function of the number of polished wafers to thereby control the average removal rate of each wafer.

3. An apparatus for polishing a top layer of each of a plurality of semiconductor wafers, comprising:

a rotatable platen having attached thereto a polishing pad for rotatable contact with a top layer of successive semiconductor wafers;

means for depositing an abrasive slurry onto a polishing surface of the polishing pad;

means for measuring and remeasuring a thickness of the top layer of at least one semiconductor wafer at a predetermined number of points of the top layer of the at least one semiconductor wafer to determine a removal rate of the top layer at such points; and means for conditioning the polishing surface of the polishing pad when the removal rate at a predetermined radius of the at least one measured and remeasured top layer, as determined by the means for measuring and remeasuring, changes from a desired value by a predetermined value, the means for conditioning rotatably creating channels within an area of the polishing surface of the polishing pad corresponding to the predetermined radius for an interval corresponding to the change in the removal rate at such predetermined radius.

4. A method for polishing a top layer of each of a plurality of semiconductor wafers, comprising the steps of:

measuring a thickness of the top layer of at least one semiconductor wafer at a predetermined number of points of the top layer of the at least one semiconductor wafer;

rotating a platen, the platen including a pad covering a planar surface of the platen, the pad having an upper surface;

depositing an abrasive slurry onto the upper surface of the pad;

pressing the upper surface of the pad against successive rotating semiconductor wafers, a rotational axis of each semiconductor wafer offset from a rotational axis of the platen;

remeasuring the thickness of the top layer of the at least one semiconductor wafer at the predetermined number of points of the top layer of the at least one semiconductor wafer; and based at least upon the measured thickness and the remeasured thickness, calculating when a removal rate changes from a desired value by a predetermined value at a predetermined radius of the at least one semiconductor wafer and, in response thereto, conditioning each area of the pad corresponding to the predetermined radius for an interval corresponding to the change in the removal rate at such predetermined radius.

5. The method of claim 4, further comprising the steps of:

determining the number of wafers polished by the pad; and governing the duration of the conditioning intervals for succeeding wafers to be polished as a function of the number of wafers.

6. An apparatus for polishing a top layer of each of a plurality of semiconductor wafers, comprising:

a rotatable platen having attached thereto a polishing pad for rotatable contact with a top layer of each of a plurality of successive semiconductor wafers;

means for depositing an abrasive slurry onto a polishing surface of the polishing pad;

means for measuring and remeasuring a thickness of the top layer of at least one of the semiconductor wafers at a predetermined number of points of the top layer of the at least one of the semiconductor wafers to determine the removal rates of the top layer at such points; and means for conditioning the polishing surface of the polishing pad when the removal rate at a predetermined radius of the polished top layer of the at least one semiconductor wafer changes from a desired value by a predetermined value, the means for conditioning rotatably creating channels within an area of the polishing surface of the polishing pad for an interval corresponding to the change in the removal rate, the area corresponding to the predetermined radius.

7. A method for polishing a top layer of a semiconductor wafer, comprising the steps of:

measuring a thickness of the top layer of at least one semiconductor wafer at a predetermined number of points of the top layer of the at least one semiconductor wafer;

rotating a platen, the platen including a pad covering a planar surface of the platen, the pad having an upper surface;

depositing an abrasive slurry onto the upper surface of the pad;

pressing the upper surface of the pad against a rotating semiconductor wafer, a rotational axis of the semiconductor wafer offset from a rotational axis of the platen;

remeasuring the thickness of the top layer of the at least one semiconductor wafer at the predetermined number of points of the top layer of the at least one semiconductor wafer polished by the pad; and based at least upon the measured thickness and the remeasured thickness, calculating the removal rate at predetermined radii of the semiconductor wafer, calculating a weighted average value of the removal rates, subtracting each removal rate from the weighted average value to derive a residual for each predetermined radius of the semiconductor wafer, determining the sign of each residual, creating a first array of the resultant ones, minus ones and zeros, the ones corresponding to positive sign residuals surrounded by neighboring residuals having a positive sign, the minus ones corresponding to negative sign residuals surrounded by neighboring residuals having a negative sign and the zeros corresponding to one of a positive sign residual having at least one neighboring residual having a negative sign and a negative sign residual having at least one neighboring residual having a positive sign, mapping the first array into a second array and into a third array, multiplying the second and third arrays to generate a fourth array, multiplying the fourth array by a sensitivity factor to derive a conditioning recipe correction, adding the conditioning recipe correction to an initial recipe to generate a new conditioning recipe, and conditioning the pad in accordance with the new conditioning recipe.

8. A method for polishing a top layer of a plurality of semiconductor wafers, comprising the steps of:

measuring a thickness of a top layer of a plurality of semiconductor wafers at a predetermined number of points of the top layer of the plurality of semiconductor wafers;

rotating a platen, the platen including a pad covering a planar surface of the platen, the pad having an upper surface;

depositing an abrasive slurry onto the upper surface of the pad;

pressing the upper surface of the pad against successive rotating semiconductor wafers, a rotational axis of the semiconductor wafers offset from a rotational axis of the platen;

remeasuring the thickness of the top layer of the at least one semiconductor wafer at the predetermined number of points of the top layer of at least one of the plurality of semiconductor wafers polished by the pad; and based at least upon the measured thickness and the remeasured thickness, calculating the removal rates at predetermined radii of the at least one semiconductor wafer and, if the removal rate for at least one of the predetermined radii changes by a first predetermined value, calculating a correction to a conditioning recipe, determining within wafer uniformity of removal rate, and in response to a deviation from the within wafer uniformity greater than a second predetermined value, modifying the correction to the conditioning recipe, and conditioning the pad in accordance with the modified corrected conditioning recipe, the modified corrected conditioning recipe utilized for conditioning each area of the pad corresponding to the predetermined radii for respective intervals corresponding to changes in removal rates at such radii.

9. An apparatus for polishing a top layer of each of a plurality of semiconductor wafers, comprising:

a rotatable platen, the rotatable platen including a pad covering a planar surface of the platen, the pad having an upper surface;

means for depositing an abrasive slurry onto the upper surface of the pad;

means for pressing the upper surface of the pad against successive rotating semiconductor wafers, a rotational axis of the semiconductor wafers offset from a rotational axis of the platen;

means for measuring and remeasuring a thickness of the top layer of at least one semiconductor wafer at a predetermined number of points of a top layer of at least one semiconductor wafer polished by the pad; and means for calculating, based at least upon the measured thickness and the remeasured thickness, when a removal rate at a predetermined radius of at least one semiconductor wafer changes from a desired value by a predetermined value and, in response thereto, conditioning each area of the pad corresponding to the predetermined radius for an interval corresponding to the change in removal rate at such radius.

10. The apparatus of claim 9, further comprising:

means for determining a number of wafers polished by the pad; and means for governing the duration of the conditioning intervals for succeeding wafers to be polished as a function of the number of wafers to thereby control the average removal rate of each wafer.

11. An apparatus for polishing a top layer of each of a plurality of semiconductor wafers, comprising:

means for measuring a thickness of the top layer of at least one semiconductor wafer at a predetermined number of points of a top layer of the at least one semiconductor wafer;

a rotatable platen, the rotatable platen including a pad covering a planar surface of the platen, the pad having an upper surface;

means for depositing an abrasive slurry onto the upper surface of the pad;

means for pressing the upper surface of the pad against successive rotating semiconductor wafers, a rotational axis of each semiconductor wafer offset from a rotational axis of the rotatable platen;

means for remeasuring the thickness of the top layer of the at least one semiconductor wafer at the predetermined number of points of the top layer of the at least one semiconductor wafer; and means for calculating, based at least upon the measured thickness and the remeasured thickness, when a removal rate at a predetermined radius of the at least one semiconductor wafer changes from a desired value by a predetermined value and, in response thereto, conditioning each area of the pad corresponding to the predetermined radius for an interval corresponding to the change in removal rate at such radius.

12. The apparatus of claim 11, further comprising:

means for determining a number of wafers polished by the pad; and governing the duration of the conditioning intervals for succeeding wafers to be polished as a function of the number of wafers.

13. An apparatus for polishing a top layer of a semiconductor wafer, comprising:

means for measuring a thickness of the top layer of the semiconductor wafer at a predetermined number of points of the top layer of at least one semiconductor wafer;

a rotatable platen, the platen including a pad covering a planar surface of the platen, the pad having an upper surface;

means for depositing an abrasive slurry onto the upper surface of the pad;

means for pressing the upper surface of the pad against a rotating semiconductor wafer, a rotational axis of the semiconductor wafer offset from a rotational axis of the rotatable platen;

means for remeasuring the predetermined number of points of the top layer of at least one semiconductor wafer polished by the pad; and means for calculating, based at least upon the measured thickness and the remeasured thickness, the removal rate at predetermined radii of at least one semiconductor wafer by calculating a weighted average value of the removal rates, subtracting each removal rate from the weighted average value to derive a residual for each predetermined radius of the semiconductor wafer, determining the sign of each residual, creating a first array of the resultant ones, minus ones and zeros, the ones corresponding to positive sign residuals surrounded by neighboring residuals having a positive sign, the minus ones corresponding to negative sign residuals surrounded by neighboring residuals having a negative sign and the zeros corresponding to one of a positive sign residual having at least one neighboring residual having a negative sign and a negative sign residual having at least one neighboring residual having a positive sign;

means for mapping the first array into second and third arrays, and for multiplying the second and third arrays to generate a fourth array, and for multiplying the fourth array by a sensitivity factor to derive a conditioning recipe correction and adding the conditioning recipe correction to an initial recipe to generate a new conditioning recipe; and means for conditioning the pad in accordance with the new conditioning recipe.

14. An apparatus for polishing a top layer of a plurality of semiconductor wafers, comprising:

means for measuring a thickness of the top layer of at least one semiconductor wafer at a predetermined number of points of a top layer of the at least one of a plurality of semiconductor wafers;

a rotatable platen, the rotatable platen including a pad covering a planar surface of the platen, the pad having an upper surface;

means for depositing an abrasive slurry onto the upper surface of the pad;

means for pressing the upper surface of the pad against successive rotating semiconductor wafers, a rotational axis of the semiconductor wafers offset from a rotational axis of the rotatable platen;

means for remeasuring the thickness of the top layer of the at least one semiconductor wafer at the predetermined number of points of the top layer of the at least one of the semiconductor wafers polished by the pad; and means for calculating, based at least upon the measured thickness and the remeasured thickness, the removal rate at predetermined radii of the at least one semiconductor wafer and, if the removal rate for adjacent radii changes from a desired value by a first predetermined value, calculating a correction to a conditioning recipe, determining within wafer uniformity of removal rate, and in response to a deviation from within wafer uniformity greater than a second predetermined value, modifying the correction to the conditioning recipe; and means for conditioning each area of the pad corresponding to those predetermined radii whose removal rate changes by the first predetermined value, in accordance with the modified corrected conditioning recipe.

15. A method for polishing a top layer of a plurality of semiconductor wafers, comprising the steps of:

rotating the plurality of semiconductor wafers about a first rotational axis;

measuring a thickness of the top layer of at least one semiconductor wafer at a plurality of points of the top layer of the at least one of a plurality of semiconductor wafers;

rotating a platen about a second rotational axis, the second rotational axis offset from the first rotational axis, the platen including a pad covering a planar surface of the platen, the pad having an upper surface;

depositing an abrasive slurry onto the upper surface of the pad;

pressing the upper surface of the pad against a rotating semiconductor wafer;

remeasuring the thickness of the top layer of the at least one semiconductor wafer at the predetermined number of points of the top layer of at least one of the plurality of semiconductor wafers polished by the pad;

based at least upon the measured thickness and the remeasured thickness, calculating a removal rate at predetermined radii for at least one of the plurality of semiconductor wafers, arranging the removal rates into a matrix, determining a first order coefficient regression of removal rates, in response to a determination that a slope at a given radius is at least a predetermined value determining whether a common sign exists for adjacent radii, in response to a determination that a common sign exists for adjacent radii, generating a scale amount of conditioning of the pad; and determining for at least one wafer whether a standard deviation of removal rate is greater than a predetermined value and, in response to such determination, calculating the average value of removal rates for such wafer, subtracting each removal rate for such wafer from the average value to derive residuals, determining the sign of each residual, determining whether a plurality of adjacent radii have the same sign residual and, in response to such determination, changing a conditioning recipe in accordance with the scale amount of conditioning.

16. An apparatus for polishing a top layer of a plurality of semiconductor wafers, comprising:

means for rotating the plurality of semiconductor wafers about a first rotational axis;

means for measuring a thickness of the top layer of at least one semiconductor wafer at a plurality of points of the top layer of the at least one of a plurality of semiconductor wafers;

means for rotating a platen about a second rotational axis, the second rotational axis offset from the first rotational axis, the platen including a pad covering a planar surface of the platen, the pad having an upper surface;

means for depositing an abrasive slurry onto the upper surface of the pad;

means for pressing the upper surface of the pad against a rotating semiconductor wafer;

means for remeasuring the thickness of the top layer of the at least one semiconductor wafer at the predetermined number of points of the top layer of at least one of the plurality of semiconductor wafers polished by the pad;

means for calculating, based at least upon the measured thickness and the remeasured thickness, a removal rate at predetermined radii for at least one of the plurality of semiconductor wafers, arranging the removal rates into a matrix, determining a first order coefficient regression of removal rates, in response to a determination that a slope at a given radius is at least a predetermined value determining whether a common sign exists for adjacent radii, in response to a determination that a common sign exists for adjacent radii, generating a scale amount of conditioning of the pad; and means for determining for at least one wafer whether a standard deviation of removal rate is greater than a predetermined value, and in response to such determination, calculating the average value of removal rates for such wafer, subtracting each removal rate for such wafer from the average value to derive residuals, determining the sign of each residual, determining whether a plurality of adjacent radii have the same sign residual, and in response to such determination, changing a conditioning recipe in accordance with the scale amount of conditioning.

17. A method for polishing a top layer of a semiconductor wafer, comprising the steps of:

measuring a thickness of the top layer of at least one semiconductor wafer at a predetermined number of points of the top layer of the at least one semiconductor wafer;

rotating a platen, the platen including a pad covering a planar surface of the platen, the pad having an upper surface;

depositing an abrasive slurry onto the upper surface of the pad;

pressing the upper surface of the pad against a rotating semiconductor wafer, a rotational axis of the semiconductor wafer offset from a rotational axis of the platen;

remeasuring the thickness of the top layer of the at least one semiconductor wafer at the predetermined number of points of the top layer of at least one semiconductor wafer polished by the pad; and based at least upon the measured thickness and the remeasured thickness, calculating the removal rate at predetermined radii of the semiconductor wafer, calculating a weighted average value of the removal rates, subtracting each removal rate from the weighted average value to derive a residual for each predetermined radius of the semiconductor wafer to generate a new conditioning recipe, wherein a conditioning time at those areas of the pad which most affect specific radii on the semiconductor wafer in which the removal rate is below the weighted average value is increased, and the conditioning time at those areas on the pad which most affect the specific radii on the semiconductor wafer in which the removal rate is above the weighted average is decreased, and conditioning the pad in accordance with the new conditioning recipe.

18. An apparatus for polishing a top layer of a semiconductor wafer, comprising:

means for measuring a predetermined number of points of the top layer of at least one semiconductor wafer;

a rotatable platen, the platen including a pad covering a planar surface of the platen, the pad having an upper surface;

means for depositing an abrasive slurry onto the upper surface of the pad;

means for pressing the upper surface of the pad against a rotating semiconductor wafer, a rotational axis of the semiconductor wafer offset from a rotational axis of the rotatable platen;

means for remeasuring the thickness of the top layer of the at least one semiconductor wafer at the predetermined number of points of the top layer of at least one semiconductor wafer polished by the pad;

means for calculating, based at least upon the measured thickness and the remeasured thickness, the removal rate at predetermined radii of the at least one semiconductor wafer by calculating a weighted average value of the removal rates, subtracting each removal rate from the weighted average value to derive a residual for each predetermined radius of the semiconductor wafer to generate a new conditioning recipe, wherein a conditioning time at those areas of the pad which most affect specific radii on the semiconductor wafer in which the removal rate is below the weighted average value is increased, and the conditioning time at those areas on the pad which most affect the specific radii on the semiconductor wafer in which the removal rate is above the weighted average is decreased; and means for conditioning the pad in accordance with the new conditioning recipe.

19. A method for polishing a top layer of a semiconductor wafer, comprising the steps of:

measuring a thickness of the top layer of at least one semiconductor wafer at a predetermined number of points of the top layer of the at least one semiconductor wafer;

rotating a platen, the platen including a pad covering a planar surface of the platen, the pad having an upper surface;

depositing an abrasive slurry onto the upper surface of the pad;

pressing the upper surface of the pad against a rotating semiconductor wafer, a rotational axis of the semiconductor wafer offset from a rotational axis of the platen;

remeasuring the thickness of the top layer of the at least one semiconductor wafer at the predetermined number of points of the top layer of at least one semiconductor wafer polished by the pad; and based at least upon the measured thickness and the remeasured thickness, calculating the removal rate at predetermined radii of at least one semiconductor wafer, calculating a weighted average value to derive a residual for each predetermined radius of the semiconductor wafer to thereby generate a first array consisting of residuals, determining the sign of each residual to thereby generate a second array consisting of ones, minus ones and zeros, each of the ones, minus ones and zeros corresponding to the sign of each residual, mapping the second array to a third array, the third array smaller than the second array, the third array consisting of ones, minus ones and zeros, the ones corresponding to positive sign residuals surrounded by neighboring residuals having a positive sign, the minus ones corresponding to negative sign residuals surrounded by neighboring residuals having a negative sign and the zeros corresponding to one of a positive sign residual having at least one neighboring residual having a negative sign and a negative sign residual having at least one neighboring residual having a positive sign, mapping the third array into a fourth array in which the first mapping obeys an algorithm designed to reflect the geometric relationship of specific areas on the pad to specific radii on the wafer, mapping the first array into a fifth array in which the mapping obeys the algorithm designed to reflect the geometric relationship of specific areas on the pad to specific radii on the wafer, multiplying the fourth array and the fifth array to generate a sixth array, multiplying the sixth array by a sensitivity factor to derive a conditioning recipe correction, and adding the conditioning recipe correction to an initial recipe to generate a new conditioning recipe; and conditioning the pad in accordance with the new conditioning recipe.

20. An apparatus for polishing a top layer of a semiconductor wafer, comprising:

means for measuring a thickness of the top layer of at least one semiconductor wafer at a predetermined number of points of the top layer of the at least one semiconductor wafer;

a rotatable platen, the platen including a pad covering a planar surface of the platen, the pad having an upper surface;

means for depositing an abrasive slurry onto the upper surface of the pad;

means for pressing the upper surface of the pad against a rotating semiconductor wafer, a rotational axis of the semiconductor wafer offset from a rotational axis of the rotatable platen;

means for remeasuring the thickness of the top layer of the at least one semiconductor wafer at the predetermined number of points of the top layer of at least one semiconductor wafer polished by the pad; and means for calculating, based at least upon the measured thickness and the remeasured thickness, the removal rate at predetermined radii of at least one semiconductor wafer, calculating a weighted average value to derive a residual for each predetermined radius of the semiconductor wafer to thereby generate a first array consisting of residuals, determining the sign of each residual to thereby generate a second array consisting of ones, minus ones and zeros, each of the ones, minus ones and zeros corresponding to the sign of each residual, mapping the second array to a third array, the third array smaller than the second array, the third array consisting of ones, minus ones and zeros, the ones corresponding to positive sign residuals surrounded by neighboring residuals having a positive sign, the minus ones corresponding to negative sign residuals surrounded by neighboring residuals having a negative sign and the zeros corresponding to one of a positive sign residual having at least one neighboring residual having a negative sign and a negative sign residual having at least one neighboring residual having a positive sign, mapping the third array into a fourth array in which the first mapping obeys an algorithm designed to reflect the geometric relationship of specific areas on the pad to specific radii on the wafer, mapping the first array into a fifth array in which the mapping obeys the algorithm designed to reflect the geometric relationship of specific areas on the pad to specific radii on the wafer, multiplying the fourth array and the fifth array to generate a sixth array, multiplying the sixth array by a sensitivity factor to derive a conditioning recipe correction, and adding the conditioning recipe correction to an initial recipe to generate a new conditioning recipe; and means for conditioning the pad in accordance with the new conditioning recipe.

* * * * *